(12) United States Patent
Yamashita et al.

(10) Patent No.: US 10,796,517 B2
(45) Date of Patent: Oct. 6, 2020

(54) INFORMATION PROCESSING APPARATUS, INFORMATION PROCESSING METHOD, AND RECORDING MEDIUM TO CALCULATE WAITING TIME IN QUEUE USING ACQUIRED NUMBER OF OBJECTS

(71) Applicant: CANON KABUSHIKI KAISHA, Tokyo (JP)

(72) Inventors: Yutaka Yamashita, Shiroi (JP); Daisuke Nishino, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 35 days.

(21) Appl. No.: 15/971,769

(22) Filed: May 4, 2018

(65) Prior Publication Data
US 2018/0350179 A1 Dec. 6, 2018

(30) Foreign Application Priority Data
May 31, 2017 (JP) .................. 2017-107693

(51) Int. Cl.
*G06K 9/00* (2006.01)
*G07C 11/00* (2006.01)
(Continued)

(52) U.S. Cl.
CPC .......... *G07C 11/00* (2013.01); *G06K 9/00778* (2013.01); *G06Q 10/04* (2013.01);
(Continued)

(58) Field of Classification Search
CPC .......... G06K 9/00362; G06K 9/00369; G06K 9/00624; G06K 9/00771; G06K 9/00778; G06K 9/00785; G07C 9/00; G07C 11/00; G07C 2011/02; G07C 2011/04; G06Q 10/04; G06T 7/00; G06T 2207/10004; G06T 2207/10016; G06T 2207/30232; G06T 2207/30242; G08G 1/01; G08G 1/0104; G08G 1/0125; G08G 1/0129; G08G 1/0133; G08G 1/04; G08G 1/065
USPC ....... 382/100, 103, 104, 115, 118, 155, 159, 382/160, 173, 181, 192, 194, 224–228, 382/282, 291, 325; 348/143, 148–150,
(Continued)

(56) References Cited

U.S. PATENT DOCUMENTS 6,829,583 B1 * 12/2004 Knapp ................ G06Q 10/02
  705/5
7,652,687 B2 * 1/2010 Sorensen ................ G07C 9/00
  348/150
(Continued)

FOREIGN PATENT DOCUMENTS

JP    2008-287361 A    11/2008

*Primary Examiner* — Eric Rush
(74) *Attorney, Agent, or Firm* — Canon U.S.A., Inc. IP Division

(57) ABSTRACT

An information processing apparatus predicts a waiting time by suppressing a reduction in accuracy of waiting-time prediction even if the number of people waiting in a line is small. The information processing apparatus includes a calculation unit that calculates a waiting time, based on a first set of counted objects in a case where the number of first set of counted objects is less than a predetermined number and based on a second set of counted objects in a case where the first set of counted objects is greater than or equal to the predetermined number.

11 Claims, 7 Drawing Sheets

(51) Int. Cl.
*G06T 7/00* (2017.01)
*G06Q 10/04* (2012.01)
*G08G 1/065* (2006.01)
*G08G 1/01* (2006.01)
*G07C 9/00* (2020.01)
*G08G 1/04* (2006.01)

(52) U.S. Cl.
CPC .................. *G06T 7/00* (2013.01); *G07C 9/00* (2013.01); *G08G 1/01* (2013.01); *G08G 1/0104* (2013.01); *G08G 1/0129* (2013.01); *G08G 1/04* (2013.01); *G08G 1/065* (2013.01); *G06T 2207/10004* (2013.01); *G06T 2207/30242* (2013.01); *G07C 2011/02* (2013.01); *G07C 2011/04* (2013.01)

(58) Field of Classification Search
USPC ...... 348/156, 157, 169–172; 377/3, 6, 9, 10, 377/19, 20; 705/7.13, 7.15, 7.16; 187/391, 392
See application file for complete search history.

(56) References Cited

U.S. PATENT DOCUMENTS

| | | | | |
|---|---|---|---|---|
| 9,245,247 | B2* | 1/2016 | Raja | G06Q 10/0631 |
| 9,576,371 | B2* | 2/2017 | Mongeon | G06K 9/00778 |
| 2008/0312871 | A1* | 12/2008 | Salcedo | G05B 15/02 702/179 |
| 2009/0034846 | A1* | 2/2009 | Senior | G06K 9/00778 382/190 |
| 2009/0063205 | A1* | 3/2009 | Shibasaki | G06Q 10/02 705/5 |
| 2010/0277276 | A1* | 11/2010 | Bayne | G07C 9/00111 340/5.21 |
| 2013/0223678 | A1* | 8/2013 | Brunetti | G06K 9/00778 382/103 |
| 2014/0180848 | A1* | 6/2014 | Argue | G07G 1/01 705/16 |
| 2016/0191865 | A1* | 6/2016 | Beiser | G06K 9/00221 348/156 |
| 2017/0083831 | A1* | 3/2017 | Ghosh | G06Q 10/06 |
| 2017/0161562 | A1* | 6/2017 | Astrom | G06K 9/00771 |
| 2018/0268391 | A1* | 9/2018 | Hayashi | G06Q 20/20 |
| 2018/0286068 | A1* | 10/2018 | Matsubara | G06T 7/20 |

* cited by examiner

INFORMATION PROCESSING APPARATUS, INFORMATION PROCESSING METHOD, AND RECORDING MEDIUM TO CALCULATE WAITING TIME IN QUEUE USING ACQUIRED NUMBER OF OBJECTS

BACKGROUND

Field

The present disclosure relates to an information processing apparatus, an information processing method, and a recording medium.

Description of the Related Art

Various methods have been discussed as a technology for predicting a waiting time of a waiting line. For example, Japanese Patent Application Laid-Open NO. 2008-287361 discusses a waiting time information providing system that provides a waiting time in a facility, e.g., an attraction, of a place such as a theme park. Specifically, this waiting time information providing system calculates total time information by adding operational elements such as statistic information and prediction information to the current number of people waiting in a line in a facility of the theme park. The statistic information and the prediction information include congestion information regarding other facilities, an average number of visitors in the past, weather forecast, traffic jam information of roads leading to the theme park. According to the technology discussed in Japanese Patent Application Laid-Open NO. 2008-287361, the total time information obtained is divided by the number of people served at the facility per unit time, and thereby a waiting time when a user arrives at the facility is calculated in real time.

In calculation of a waiting time at a facility in a theme park like the case described above, it can be assumed that the number of served people per unit time to be used for division, i.e., the number of people leaving a waiting line, is substantially constant for each facility in normal operation.

In contrast, for example, in prediction of a waiting time in line in a case where the service time is not constant, such as a waiting line for taking a taxi, the number of people leaving a waiting line per unit time is not constant. Therefore, it is necessary to calculate the number of people leaving the waiting line per unit time from statistics of a predetermined time period in the past, as needed.

For example, the number of people leaving a waiting line per unit time can be calculated by installing a sensor or camera at a predetermined point in the waiting line and counting the number of human bodies passing through the predetermined point within a predetermined time period. It is conceivable that a waiting time can be predicted as follows. First, an estimated number of waiting people (a waiting line length) is counted by analyzing an image of the waiting line captured by the camera. The counted waiting line length is then divided by the calculated number of people leaving the waiting line per unit time, and the waiting time can be predicted thereby.

In the prediction of a waiting time, in a case where the number of waiting people is small and the number of people leaving the waiting line per unit time is small, the number of waiting people of a waiting line length can be incorrectly counted. If this happens, the value of a predicted waiting time diverges, leading to a reduction in prediction accuracy. A specific example of this case will be described below.

For example, assume that the number of waiting people in line for taking a taxi is counted incorrectly. In this case, if two staff members detected from a captured image are added to the number of waiting people in line for taking a taxi, the number of waiting people is incorrectly counted as 2, although the correct number of waiting people in line is 0.

For example, assume that the number of people leaving the waiting line per unit time is 0.1 (person per minute). In this case, because the correct number of waiting people of the waiting line is 0, the correct waiting time is to be predicted to be 0 minute (0/0.1=0). However, the waiting time is incorrectly calculated to be 20 minutes (2/0.1=20). In other words, a considerably long waiting time, which greatly differs from the actual waiting time, is incorrectly predicted.

If such divergence of incorrect waiting time values occurs, the number of people waiting in line is predicted to be smaller. In other words, such divergence is more prominent, as the value of the number of leaving people per unit time (a leaving rate), which is a denominator, is smaller than the incorrectly counted waiting line length, which is a numerator. This can reduce the accuracy of waiting-time prediction.

SUMMARY

An information processing apparatus includes a first count unit configured to count a number of objects in a predetermined area, a second count unit configured to count a number of objects passing through a predetermined position in the predetermined area within a unit time, a first calculation unit configured to calculate a waiting time based on the number of objects counted by the first count unit and the number of objects counted by the second count unit, and a second calculation unit configured to calculate a waiting time, based on the number of objects counted by the first count unit in a case where the number of objects counted by the first count unit is less than a predetermined number, and based on the number of objects counted by the second count unit in a case where the number of objects counted by the first count unit is greater than or equal to the predetermined number.

Further features will become apparent from the following description of exemplary embodiments with reference to the attached drawings.

DESCRIPTION OF THE EMBODIMENTS

Exemplary embodiments will be described in detail below with reference to the attached drawings. Each of the exemplary embodiments described below is an example of implementing features of the present disclosure, and can appropriately be modified or altered based on a configuration and various conditions of an apparatus to which the present disclosure is applied. The following exemplary embodiments are not seen to be limiting. Not all combinations of features described in the exemplary embodiments are necessary for a solution of the present disclosure.

A first exemplary embodiment will be described below. In the present exemplary embodiment, a waiting time at a rear portion of a waiting line is predicted from the number of waiting people forming the waiting line and a passage frequency calculated from statistics of a predetermined time period in the past. Here, "passage frequency" is an index that indicates a frequency at which a person in a waiting line exits the waiting line (a frequency of provision of a service). In the present exemplary embodiment, this passage frequency includes a passage frequency per unit time (a first passage frequency), and a passage frequency calculated on a different condition from that of the passage frequency per unit time (a second passage frequency, such as an average passage frequency and a last passage frequency to be described below).

Specifically, in the present exemplary embodiment, a threshold is provided as the number of waiting people that enables stable estimation of a waiting time. Assume that the number of waiting people in a waiting line is less than the threshold. In this case, instead of the number of people leaving the waiting line per unit time (the first passage frequency), a passage frequency on the different condition (the second passage frequency) is calculated, and a waiting time is predicted using this different passage frequency. This increases the accuracy of waiting-time prediction processing without causing divergence of a prediction value of a waiting time, even if the number of waiting people of a waiting line is small.

In the present exemplary embodiment, a case where human bodies form a waiting line will be described below as an example. However, the present exemplary embodiment is not limited to this case, and is applicable to a case where other objects, such as vehicles or animals, form a waiting line.

System Configuration

Figure 1:
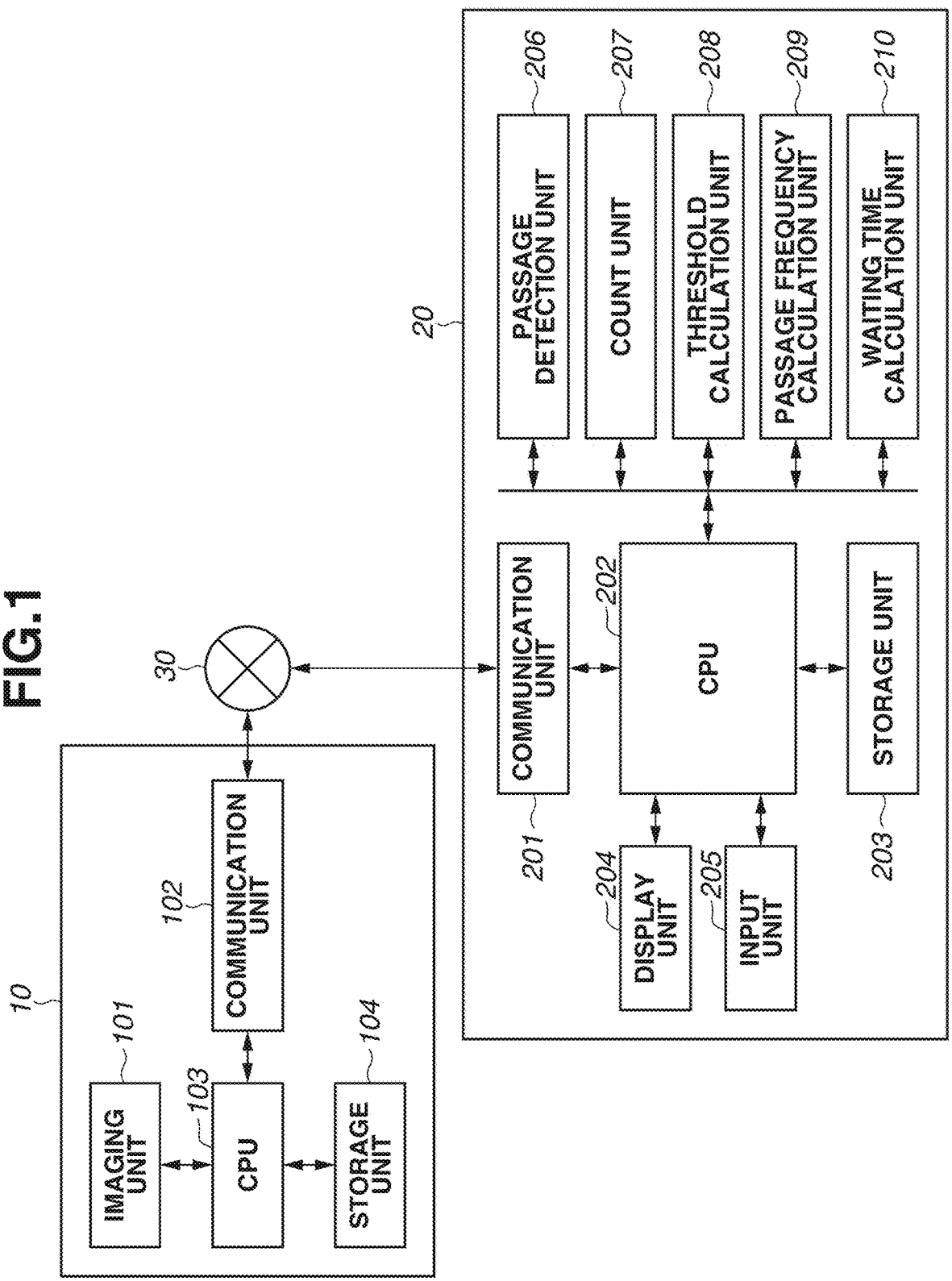
FIG. 1 is a block diagram illustrating an example of each of a hardware configuration and a functional configuration of a waiting-time prediction system.

FIG. 1 is a diagram illustrating an example of each of a hardware configuration and a functional configuration of a waiting-time prediction system according to the present exemplary embodiment.

The waiting-time prediction system in FIG. 1 includes an imaging apparatus 10, an information processing apparatus 20, and a network 30. The imaging apparatus 10 and the information processing apparatus 20 are connected via the network 30, and exchange information therebetween.

The imaging apparatus 10 transmits a captured image to the information processing apparatus 20 via the network 30. The imaging apparatus 10 according to the present exemplary embodiment is, for example, a camera for capturing an image, and can be a monitoring camera used for monitoring.

The imaging apparatus 10 can be installed on a location such as a wall surface or a ceiling, and can be a camera for capturing a moving image including one or more images. The imaging apparatus 10 can be supplied with, for example, power based on Power over Ethernet (PoE) compliant with a standard such as Institute of Electrical and Electronics Engineers (IEEE) 802.3af or IEEE 802.3at. Alternatively, the imaging apparatus 10 can receive power supplied via a cable such as a local area network (LAN) cable, or can include an independent power source.

The imaging apparatus 10 includes an imaging unit 101, a communication unit 102, a central processing unit (CPU) 103, and a storage unit 104.

The imaging unit 101 includes a lens group forming an imaging optical system, and an imaging device. The lens group includes an optical lens for focusing incident light on the imaging device to form an image. The imaging device is a device for converting light into an analog image signal, and can be consist of, for example, a charge-coupled device (CCD) sensor or a complementary metal oxide semiconductor (CMOS) sensor. The imaging unit 101 performs image processing on an analog image signal obtained from the imaging device. The imaging unit 101 also performs signal encoding and outputs an encoded image signal.

The communication unit 102 provides a wired or wireless communication interface between the imaging apparatus 10 and an external apparatus such as the information processing apparatus 20. In other words, the communication unit 102 can communicate with an external apparatus such as the information processing apparatus 20 via wireless communication. This wireless communication includes a wireless personal area network (PAN) such as Bluetooth®, Z-Wave®, ZigBee®, and Ultra Wide Band (UWB). The wireless communication also includes a wireless local area network (LAN) such as Wireless Fidelity (Wi-Fi®), and a wireless metropolitan area network (MAN) such as WiMAX™. The wireless communication also includes a wireless wide area network (WAN) such as LTE/3G.

The communication unit 102 can communicate with an external apparatus such as the information processing apparatus 20 via a wired LAN. Examples of this wired LAN include a configuration with a plurality of routers, switches, and cables meeting a communication standard such as Ethernet. The communication unit 102 can be any unit if the unit can perform communication with an external apparatus, and the standard, scale, and configuration of the communication are not limited to those described above.

The CPU 103 is an operation processing unit that performs processing such as calculations and logical decisions in each unit of the imaging apparatus 10, and controls each component (101, 102, and 104) via a system bus. The CPU 103 can read a program stored in the storage unit 104 and execute the read program, thereby implementing a function and processing of the imaging apparatus 10.

The storage unit 104 is configured of an electrically erasable nonvolatile memory such as an electrically erasable programmable read only memory (EEPROM). The storage unit 104 can include a random access memory (RAM) serving as a main memory and a work memory of the CPU 103, an external memory, and a detachable storage medium. Various kinds of information used by the CPU 103 are recorded in the storage unit 104. For example, an image captured by the imaging unit 101 can be stored in the storage unit 104.

Next, the information processing apparatus 20 will be described.

The information processing apparatus 20 can be, for example, a personal computer (PC), or can be a portable terminal such as a tablet terminal or a smartphone.

The information processing apparatus 20 includes a communication unit 201, a CPU 202, a storage unit 203, a display unit 204, and an input unit 205. The information processing apparatus 20 also includes a passage detection unit 206, a count unit 207, a threshold calculation unit 208, a passage frequency calculation unit 209, and a waiting time calculation unit 210.

The communication unit 201 provides a wired or wireless communication interface between the information processing apparatus 20 and an external apparatus such as the imaging apparatus 10, similar to the communication unit 102 of the imaging apparatus 10. The communication unit 201 receives a captured image from the imaging apparatus 10 via the network 30, and performs communication of various kinds of information between the information processing apparatus 20 and the imaging apparatus 10.

Similar to the CPU 103 of the imaging apparatus 10, the CPU 202 is an operation processing unit that performs processing such as operations and logical decisions in each unit of the information processing apparatus 20, and controls each component (201, and 203 to 210) via a system bus.

The storage unit 203 is configured of an electrically erasable nonvolatile memory such as an EEPROM, similar to the storage unit 104 of the imaging apparatus 10. The storage unit 203 can include a random access memory (RAM) serving as a main memory and a work memory of the CPU 202, an external memory, and a detachable storage medium. The storage unit 203 records information (described below), such as a waiting people count used for waiting-time calculation, a passage frequency, and a predicted waiting time, in association with each other.

The display unit 204 displays a captured image received from the imaging apparatus 10. The display unit 204 also displays setting information set in the imaging apparatus 10, a waiting time calculated by the waiting time calculation unit 210, and other various kinds of information on a display apparatus as appropriate. FIG. 1 illustrates a configuration in which the information processing apparatus 20 includes the display unit 204, but the present exemplary embodiment is not limited to this configuration. For example, the information processing apparatus 20 may not include the display unit 204, and can control a display unit (not illustrated) operating as an external apparatus, via the communication unit 201.

The input unit 205 receives instruction inputs from a user via various user interfaces, such as a mouse input, a keyboard input, and a touch input. For example, assume that an instruction for changing the setting of the imaging apparatus 10 is input into the input unit 205. Then, based on the input information, the CPU 202 generates a control command for changing the setting of the imaging apparatus 10, and outputs the generated control command to the imaging apparatus 10 via the communication unit 201. In this way, based on the information input into the input unit 205, the information processing apparatus 20 can appropriately change the setting of the imaging apparatus 10.

Counting the number of waiting people in a waiting line and detecting passage through a predetermined position in the waiting line in the present exemplary embodiment will be described with reference to FIG. 2.

A waiting time in a waiting line can be predicted from a passage frequency calculated from statistics of a predetermined time period in the past, and the number of waiting people indicating a waiting line length estimated by analyzing an image captured by the imaging apparatus 10. In this process, if objects to be counted are people, the predicted waiting time can be calculated by the following expression:

$$WTp = QL/TH$$

where $WTp$ is a predicted waiting time, $QL$ is the number of waiting people, and $TH$ is a passage frequency.

Figure 2:
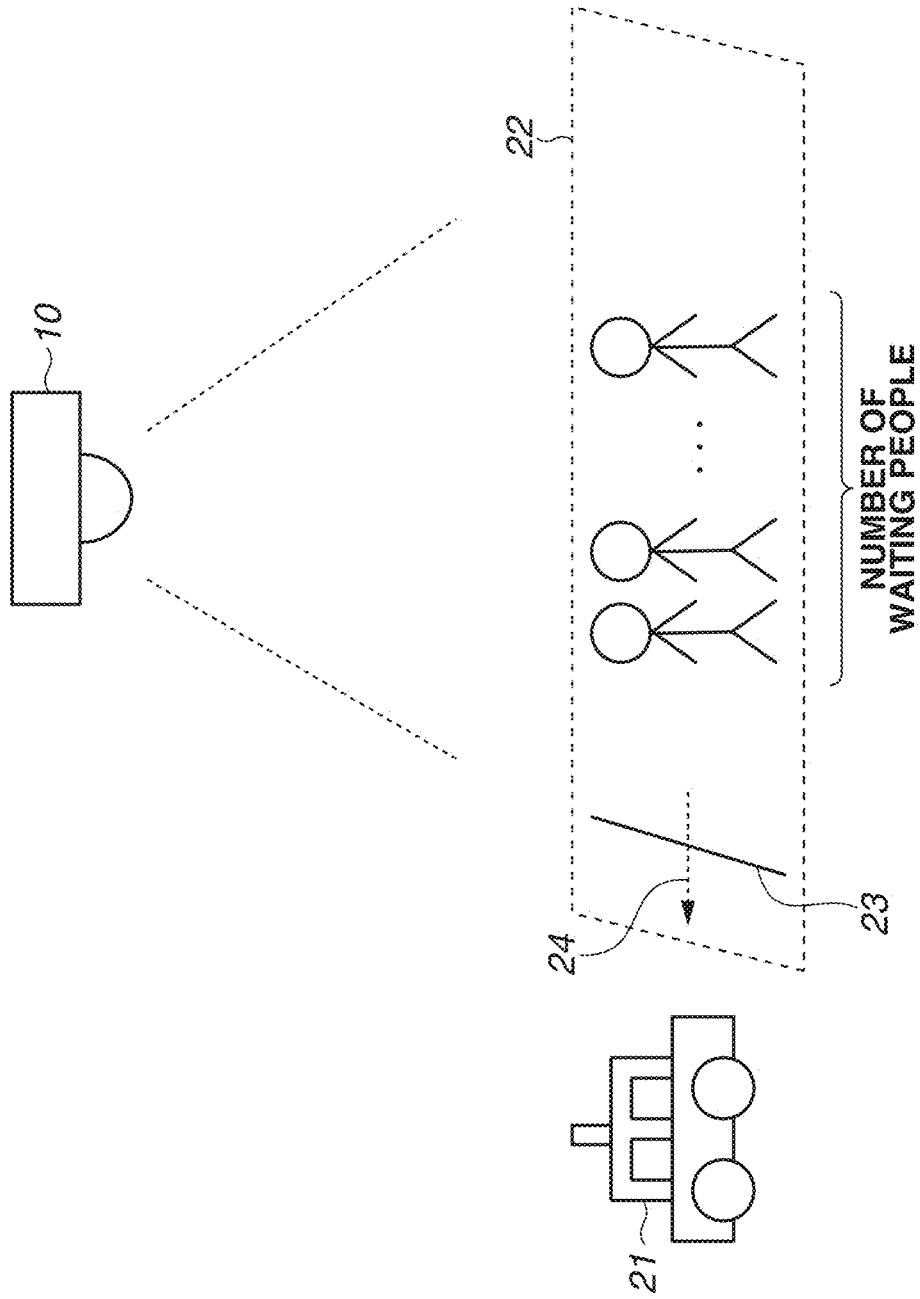
FIG. 2 is a schematic diagram illustrating an example of application of the waiting-time prediction system.

FIG. 2 illustrates a case where the waiting-time prediction system according to the present exemplary embodiment is applied to a waiting line for taking a taxi as an example of application to a real environment.

In FIG. 2, a dashed line 22 indicates a range for capturing an image of a waiting line for a taxi 21 by using the imaging apparatus 10 as a monitoring camera. The range represents a range for counting the number of people in a waiting line.

A detection line 23 is set in a direction of the waiting line toward the taxi 21. The detection line 23 is virtually set for the passage detection unit 206 of the information processing apparatus 20 to detect passage of a person in the waiting line. The people forming the waiting line are assumed to move one by one in a forward direction (a direction for detecting passage of a person) indicated by an arrow 24 of the waiting line, and pass through the detection line 23 before getting in the taxi 21. The detection line 23 can be set at any position if this position is to be passed by a person in the waiting line before the person gets in the taxi 21. The detection line 23 is typically set at the leading end of the waiting line for providing a service to human bodies forming the waiting line, as illustrated in FIG. 2. People passing through the detection line 23 in the direction opposite to the forward direction indicated by the arrow 24 are not counted as the number of passing people.

Referring to FIG. 1 again, the passage detection unit 206 of the information processing apparatus 20 detects an event of a human body passing through the predetermined position (the detection line 23) set in the waiting line for which a waiting time is to be predicted in the captured image. The passage detection unit 206 then outputs the result to the passage frequency calculation unit 209. The event of the passage of a human body through the detection line 23 can be detected using a passage sensor such as an infrared radiation sensor, or can be detected using a camera with an image analysis function of detecting passage of a human body from a captured image. In this case, the passage detection unit 206 can be provided external to the information processing apparatus 20, and transmit an acquired passage detection result to the passage frequency calculation unit 209 of the information processing apparatus 20. Passage of a human body can be detected by analyzing a video image captured by the imaging apparatus 10 by using software in the information processing apparatus 20 (a computer). The above-described detection methods can be combined.

The count unit 207 of the information processing apparatus 20 analyzes a captured image received from the imaging apparatus 10, detects human bodies within a predetermined range (within an imaging range 22 for capturing an image by the imaging apparatus 10 illustrated in FIG. 2), and counts the number of the detected human bodies as the number of waiting people. The number of human bodies counted by the count unit 207 indicates a line length of the waiting line. The counted number of human bodies is then output to the threshold calculation unit 208 and the waiting time calculation unit 210, and stored into the storage unit 203.

The imaging range 22 for counting the number of waiting people can be set beforehand to be a range that enables imaging of a waiting line by a user input from the input unit 205 of the information processing apparatus 20. The number of waiting people can be counted using one or more imaging apparatuses 10, depending on a setting condition for the imaging range 22 for counting the number of waiting people.

The threshold calculation unit 208 of the information processing apparatus 20 calculates a threshold of the number of waiting people. Specifically, the threshold calculation unit 208 can calculate the threshold of the number of people, from a statistical value, which is based on the number of waiting people in the waiting line previously stored in the storage unit 203, and the predicted waiting time calculated by the waiting time calculation unit 210 in counting of this past number of waiting people. Alternatively, the threshold of the number of waiting people can be preset as an initial value and stored in the storage unit 203.

The threshold of the number of waiting people is a threshold that an estimated waiting time calculated by the waiting time calculation unit 210 can be presumed to be stable (not to diverge) if the number of waiting people counted by the count unit 207 is greater than or equal to the threshold. The threshold calculation unit 208 also determines whether the number of human bodies counted by the count unit 207 is greater than or equal to the calculated threshold of the number of waiting people or is less than the threshold. The threshold calculation unit 208 outputs the result of the determination to the passage frequency calculation unit 209. The threshold calculation unit 208 compares the calculated threshold of the number of waiting people with the counted number of waiting people, thereby deciding a predetermined method for passage-frequency calculation from among a plurality of methods for passage-frequency calculation. In place of or in addition to the counted number of waiting people, a length threshold for a line length of the waiting line can be set as the threshold. The details of this threshold calculation will be described below with reference to FIG. 3 and FIG. 4.

Based on the result of the determination input from the threshold calculation unit 208, the passage frequency calculation unit 209 of the information processing apparatus 20 calculates a passage frequency that varies depending on the condition. Specifically, the passage frequency calculation unit 209 calculates a passage frequency in different conditions of a case in which the counted number of waiting people is greater than or equal to the threshold of the number of people, and a case in which the counted number of waiting people is less than the threshold.

Specifically, in a case where the counted number of waiting people is greater than or equal to the threshold of the number of waiting people, the passage frequency calculation unit 209 calculates how many human bodies are detected as having passed through the detection line 23 by the passage detection unit 206 within a predetermined time period. The number of detected human bodies having passed per unit time is calculated as a passage frequency, output to the waiting time calculation unit 210, and stored in the storage unit 203.

In a case where the counted number of waiting people is less than the threshold of the number of waiting people, the passage frequency calculation unit 209 calculates a different passage frequency instead of calculating the number of human bodies detected as having passed within the predetermined time period. For example, in this case, the passage frequency calculation unit 209 can calculate an average value of the passage frequencies previously stored in the storage unit 203 as a passage frequency. The passage frequency calculated by the passage frequency calculation unit 209 is output to the waiting time calculation unit 210 and stored in the storage unit 203. The average passage frequency of this case can be calculated, for example, as the reciprocal of an average of predicted waiting times stored in the storage unit 203 in the past.

In this way, in the present exemplary embodiment, in a case where the counted number of waiting people is less than the threshold, i.e., the number of waiting people is less than the predetermined number of people, a different passage frequency to be statistically stable is calculated in place of the passage frequency per unit time.

The waiting time calculation unit 210 of the information processing apparatus 20 reads out the counted number of waiting people and the corresponding passage frequency stored in the storage unit 203. The waiting time calculation unit 210 calculates a waiting time of the waiting line based on the number of waiting people counted by the count unit 207 and the passage frequency input from the passage frequency calculation unit 209.

Specifically, the waiting time calculation unit 210 calculates a predicted waiting time of the waiting line by dividing the number of waiting people counted by the count unit 207 by the passage frequency (either the first passage frequency or the second passage frequency) calculated by the passage frequency calculation unit 209. The waiting time calculated by the waiting time calculation unit 210 is stored in the storage unit 203 and displayed by the display unit 204 as appropriate. The timing of the waiting time calculation can be determined based on an interval set from the input unit 205.

As described above, in a case where the counted number of waiting people is greater than or equal to the threshold, the passage frequency calculated by the passage frequency calculation unit 209 is a passage frequency per unit time. In a case where the counted number of waiting people is less than the threshold, the passage frequency calculated by the passage frequency calculation unit 209 is, for example, an average passage frequency, which is different from the passage frequency per unit time. Therefore, in the present exemplary embodiment, in the case where the counted number of waiting people is greater than or equal to the threshold, the waiting time calculation unit 210 divides the count value of the number of waiting people by the passage frequency per unit time. In the case where the counted number of waiting people is less than the threshold, the waiting time calculation unit 210 divides the count value of the number of waiting people by the average passage frequency.

Details of Threshold Calculation

Details of threshold calculation processing executed by the threshold calculation unit 208 in the present exemplary embodiment will be described below with reference to FIG. 3 and FIG. 4.

Figure 3:
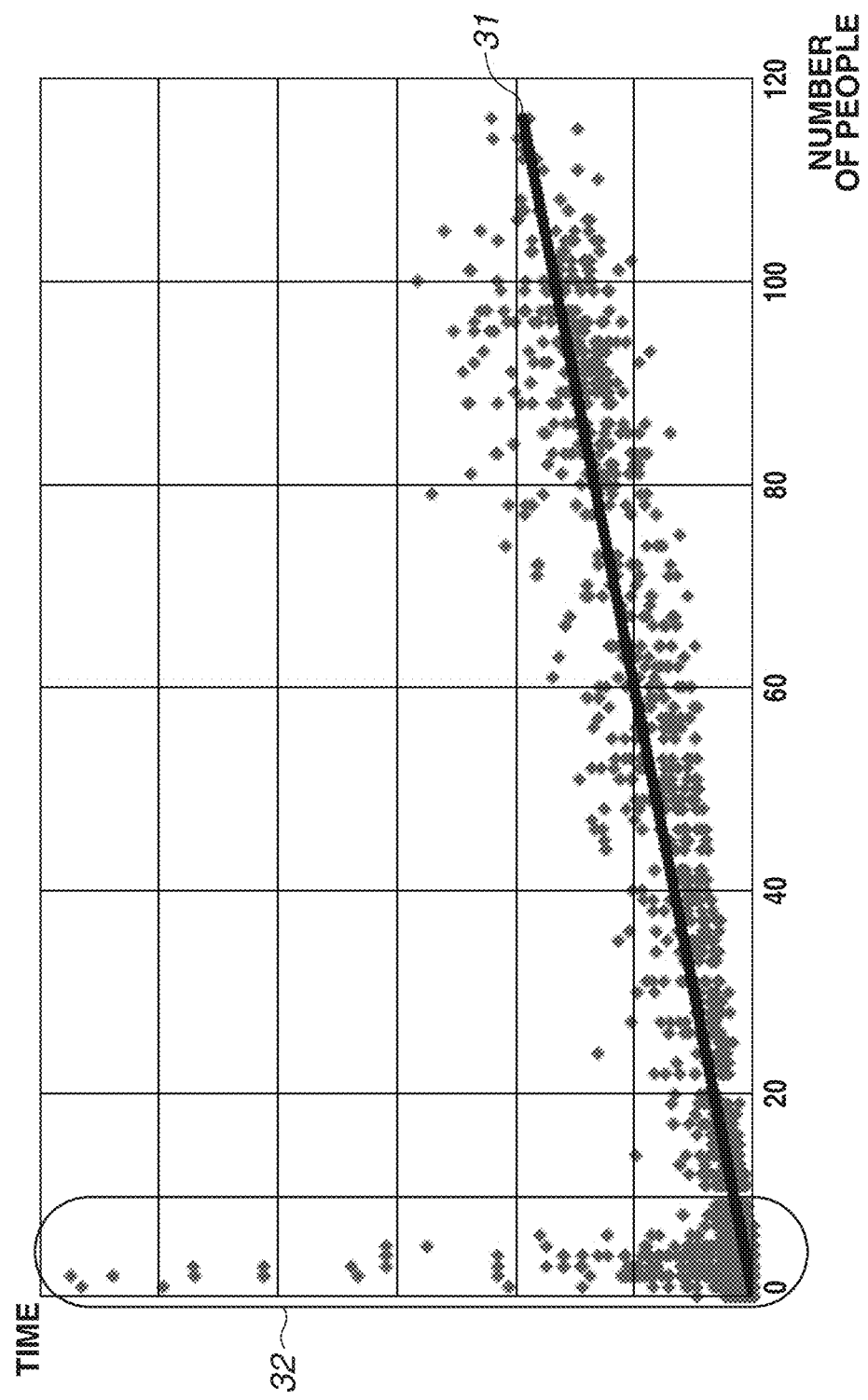
FIG. 3 is a graph illustrating an example of a correspondence of a predicted waiting time and the number of waiting people of a waiting line.

FIG. 3 is a graph in which, as an example, predicted waiting times accumulated in the storage unit 203 and the numbers of waiting people used for calculation of these predicted waiting times are plotted. In FIG. 3, a horizontal axis indicates the number of waiting people and a vertical axis indicates the predicted waiting time. As illustrated in FIG. 3, in a case where the number of waiting people is ten or less, the value of the corresponding predicted waiting time diverges, and the predicted waiting time is unstable, as represented by a distribution 32. One reason for this is that, for example, a person different from a person waiting for a taxi, such as a staff member, is detected and included in the number of waiting people.

The number of waiting people is a number that can be presumed to prevent stable calculation of a predicted waiting time, and the threshold calculation unit 208 sets this number of waiting people as a threshold. In FIG. 3, this threshold is, for example, 6.

For the calculation of a passage frequency (an average passage frequency) to be used in a case where the counted number of waiting people is less than or equal to than the threshold, a gradient 31 can be used. The gradient 31 is obtained using an approximate expression for data of the predicted waiting times previously plotted in FIG. 3. The gradient 31 indicates an average waiting time per person, and the average passage frequency is calculated as the reciprocal of the average waiting time indicated by the gradient 31.

In a case where the counted number of waiting people is less than or equal to the threshold (e.g., 6), the threshold calculation unit 208 calculates a predicted waiting time in a case where the number of waiting people is small by using the average waiting time determined by the gradient 31. For example, assume that the average waiting time is 10 seconds and the number of waiting people is two in the case where the counted number of waiting people is less than or equal to the threshold. In this case, the average passage frequency is 1/10, and the predicted waiting time is calculated as 20 seconds.

In this calculation of the average waiting time, the average waiting time can be updated each time a waiting time is calculated, or can be periodically updated. Alternatively, the average waiting time can be a fixed value calculated from data of past average waiting times calculated within a predetermined period.

Figure 4:
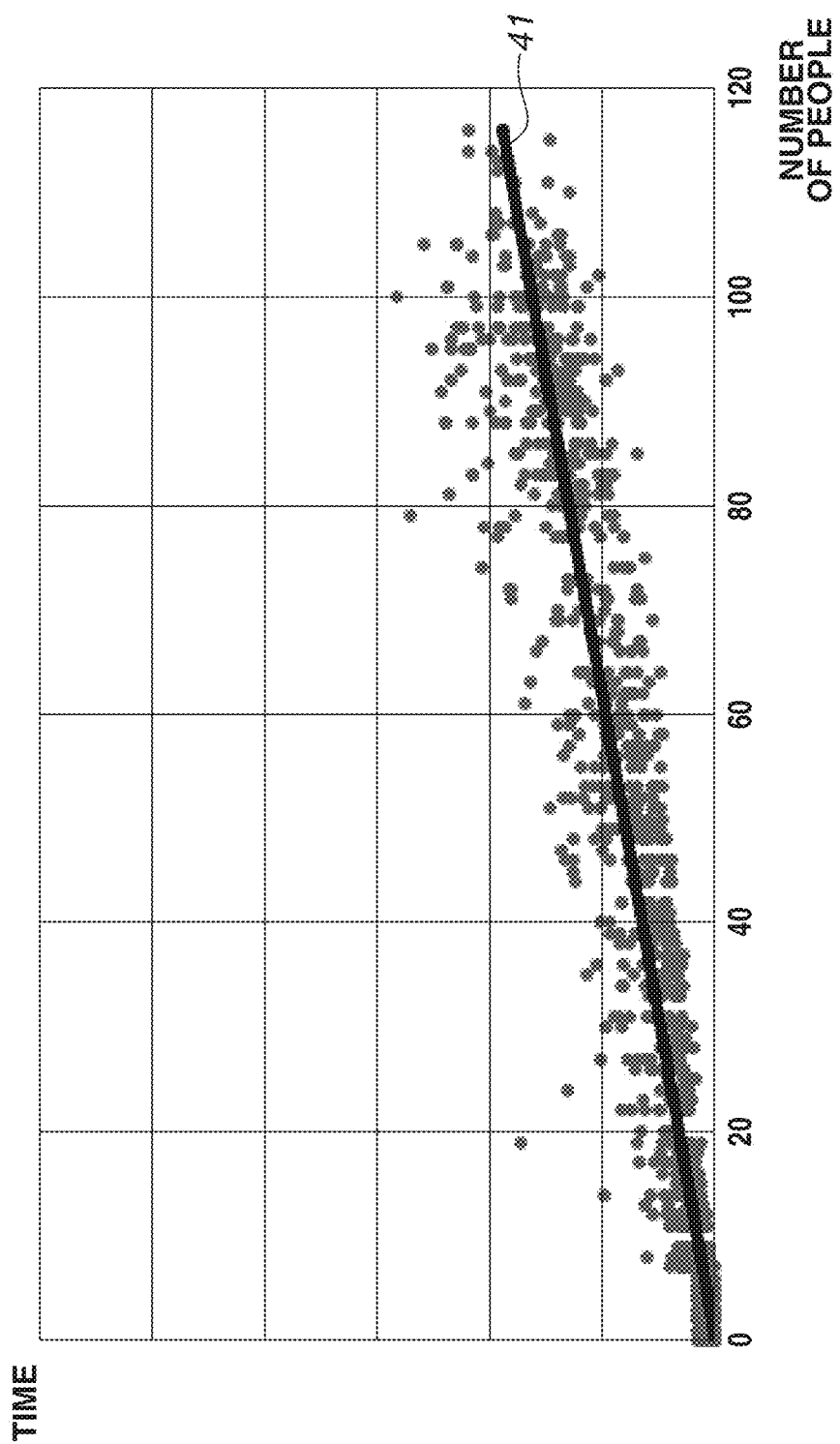
FIG. 4 is a graph illustrating an example of a case where a predicted waiting time is calculated using an average value of passage frequencies in a case where the number of waiting people is less than a threshold value.

FIG. 4 is a graph in which predicted waiting times and the numbers of waiting people used for calculation of these predicted waiting times are plotted as an example. The predicted waiting times are calculated using the average passage frequency in the case where the counted number of waiting people is less than or equal to the threshold. In FIG. 4, a horizontal axis indicates the number of waiting people and a vertical axis indicates the predicted waiting time.

In FIG. 3, the divergence is present in the distribution 32 of the predicted waiting times in the case where the counted number of waiting people is less than or equal to the threshold. In contrast, as illustrated in FIG. 4, the predicted waiting times less than or equal to the threshold are corrected and distributed in proximity to a gradient 41.

Processing Flow of Waiting-Time Prediction Processing

Figure 5:
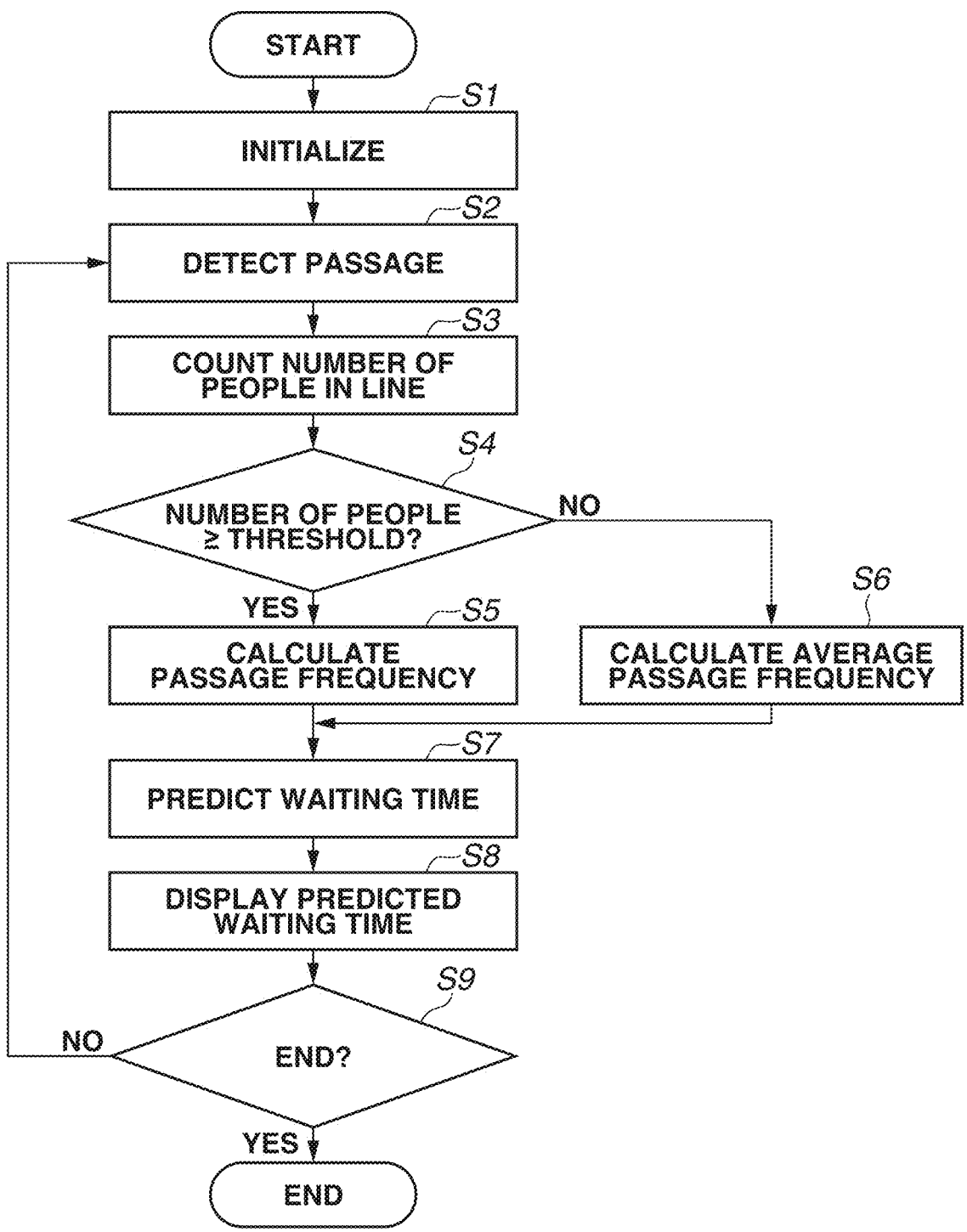
FIG. 5 is a flowchart illustrating an example of a processing procedure of waiting-time prediction processing.

FIG. 5 is a flowchart illustrating an example of waiting-time prediction processing executed by the information processing apparatus 20 according to the present exemplary embodiment. The processing illustrated in FIG. 5 is started, for example, when the waiting-time prediction system including the imaging apparatus 10 and the information processing apparatus 20 is activated. However, the start timing of the processing illustrated in FIG. 5 is not limited to this example.

The processing in FIG. 5 can be implemented by providing at least one or some of the elements illustrated in FIG. 1 as dedicated hardware. In this case, the dedicated hardware operates based on the control of the CPU 202. The CPU 202 reads a necessary program from the storage unit 203 and executes the read program. The information processing apparatus 20 can thereby execute the processing illustrated in FIG. 5.

In step S1, the CPU 202 initializes a count range for counting the number of waiting people in the waiting line in the count unit 207. This count range can be set based on setting information input via the input unit 205 by the user. The CPU 202 similarly initializes the timing for executing waiting time prediction in the passage frequency calculation unit 209, the waiting time calculation unit 210, and the display unit 204. These initial settings are not necessarily performed every time via user input. The CPU 202 can execute the initial setting by automatically reading a pre-stored value from the storage unit 203.

In the present case, assume that the accumulation data of the predicted waiting time and the threshold of the number of waiting people is insufficient to be used in calculation of an average passage frequency (processing in step S6 to be described below). As such, the CPU 202 sets, for example, data such as an average waiting time of 10 seconds and a threshold of 10 people, in the passage frequency calculation unit 209 as initial value data. The CPU 202 can subsequently update the initial value data.

In step S2, the passage detection unit 206 acquires a sensor signal from the passage sensor, such as an infrared radiation sensor, and an image analysis result in the imaging apparatus 10, and thereby detects the passage of a human body in the waiting line through the detection line 23.

In step S3, the count unit 207 counts the number of human bodies (the number of waiting people) present within the count range set in step S1.

In step S4, the threshold calculation unit 208 executes a threshold determination by comparing the number of waiting people counted in step S3 with the threshold of the number of waiting people, and outputs the result of the threshold determination to the passage frequency calculation unit 209. If the number of waiting people counted in step S3 is greater than or equal to the threshold (YES in step S4), the operation proceeds to step S5. If the number of waiting people counted in step S3 is less than the threshold (NO in step S4), the operation proceeds to step S6.

In step S5, the passage frequency calculation unit 209 performs processing for calculating a normal passage frequency. Specifically, in step S5, based on the result of detecting the human bodies passing through the detection line 23 acquired by the passage detection unit 206, the passage frequency calculation unit 209 calculates a passage frequency of a human body within a predetermined time period in the forward direction of the line indicated by the arrow 24. The calculation of the passage frequency can be executed based on the waiting time prediction timing set in step S1. The calculated passage frequency is stored in the storage unit 203.

In step S6, the passage frequency calculation unit 209 calculates an average passage frequency. As described above, this average passage frequency is calculated statistically from the accumulation data of the predicted waiting time and the number of waiting people stored in the storage unit 203.

In step S7, the waiting time calculation unit 210 calculates a waiting time from the number of waiting people (a line length) in the waiting line calculated by the count unit 207 and the passage frequency calculated by the passage frequency calculation unit 209. The calculation of the waiting time can be executed based on the waiting time prediction timing set in step S1. The calculated waiting time is stored in the storage unit 203 as a predicted waiting time. In consideration of a case where the passage frequency is 0, such as the time when the waiting-time prediction system is activated, an initial value except for a passage frequency of 0 can be pre-set.

In step S8, the display unit 204 displays, on the display apparatus, the predicted waiting time calculated in step S7. Data such as a predicted waiting time and a passage frequency in the past can be displayed based on the timing set in the display unit 204 in step S1. A preset display can be presented in a case where the passage frequency is 0.

In step S9, the waiting time calculation unit 210 or the CPU 202 determines whether to end the waiting-time prediction processing. If continuation of the execution of the waiting-time prediction processing is determined (NO in step S9), the operation returns to step S2. If ending the waiting-time prediction processing is determined (YES in step S9), the waiting-time prediction processing ends.

As described above, according to the present exemplary embodiment, the threshold calculation unit 208 compares the counted number of waiting people in the waiting line and the threshold of the number of waiting people. The threshold of the number of waiting people can be calculated from the statistical data of the number of waiting people and the predicted waiting time acquired beforehand by measuring a threshold that enables stable estimation of a predicted waiting time.

In a case where the counted number of waiting people is less than the threshold, the passage frequency calculation unit 209 calculates a stable passage frequency by using the accumulation data of the number of people and the predicted waiting time, instead of using a passage frequency per unit time. In other words, the method for calculating the passage frequency for prediction of a waiting time is changed based on the number of waiting people (the waiting line length).

According to the present exemplary embodiment, the above-described operation prevents the value of a predicted waiting time from diverging, even if the number of waiting people in a waiting line is small. Therefore, for example, even if false detection of a person, such as a staff member, occurs in the counting of the number of waiting people, a reduction in prediction accuracy in the prediction of a waiting time of a waiting line is effectively prevented.

A second exemplary embodiment will be described in detail below with reference to FIG. 6 and FIG. 7. Just the differences between the second exemplary embodiment and the first exemplary embodiment will be described. In the present exemplary embodiment, a passage frequency is calculated in consideration of a case where new passage is not detected for a while following the time when the passage of a person in a waiting line through a detection line 23 is last detected in passage frequency calculation executed by the passage frequency calculation unit 209. This enables easy and appropriate prediction of a waiting time, even in a case where a preset service providing interval exceeds a preset unit time for passage frequency calculation, such as nighttime.

Figure 6:
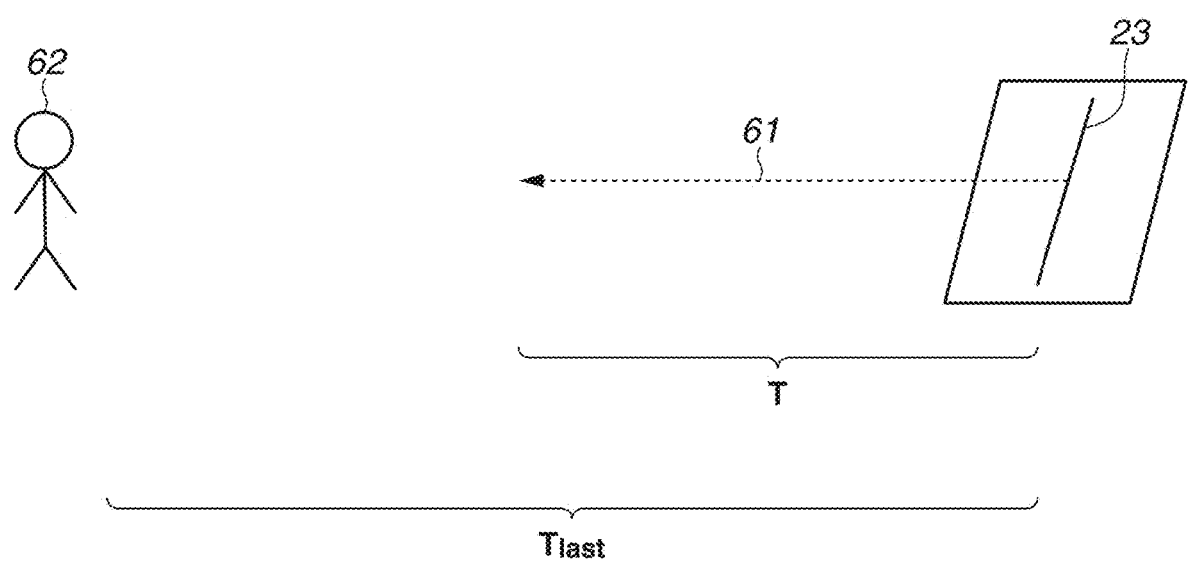
FIG. 6 is a schematic diagram illustrating a passage-frequency calculation method in a case where a passage frequency is 0.

FIG. 6 is a diagram illustrating calculation of a passage frequency according to the second exemplary embodiment.

Assume that new passage is not detected for a while following the time when passage of a person in the waiting line through the detection line 23 is last detected. According to the first exemplary embodiment, the normal passage frequency (step S5 in FIG. 5) is calculated using the number of people having passed through the detection line 23 within a preset time interval (T). In this case, as illustrated in FIG. 6, there is no person passing through the detection line 23 within a period 61 going back from the present time by a time (T), and therefore, the number of passing people is 0.

In the case where the number of people passing through the detection line 23 during the time interval (T) is counted as 0 as described above, the passage frequency is 0/T=0. The passage frequency of 0 cannot form a denominator when the waiting time calculation unit 210 calculates a predicted waiting time. Therefore, the predicted waiting time cannot be appropriately updated.

The passage frequency calculation unit 209 according to the second exemplary embodiment uses the last passage frequency in a case where the passage of a new person through the detection line 23 is not detected after a time interval (Tlast) having elapsed from the time when passage is last detected. That is, the last passage frequency is used in a case where Tlast>T. In other words, the passage frequency calculation unit 209 uses a passage frequency (TH1) used at the time when a person 62 who has last passed through the detection line 23 is detected.

The value of the set time interval (T) can be appropriately adjusted using this last passage frequency (TH1). The waiting time calculation unit 210 calculates a predicted waiting time by using this last-used passage frequency (TH1).

Figure 7:
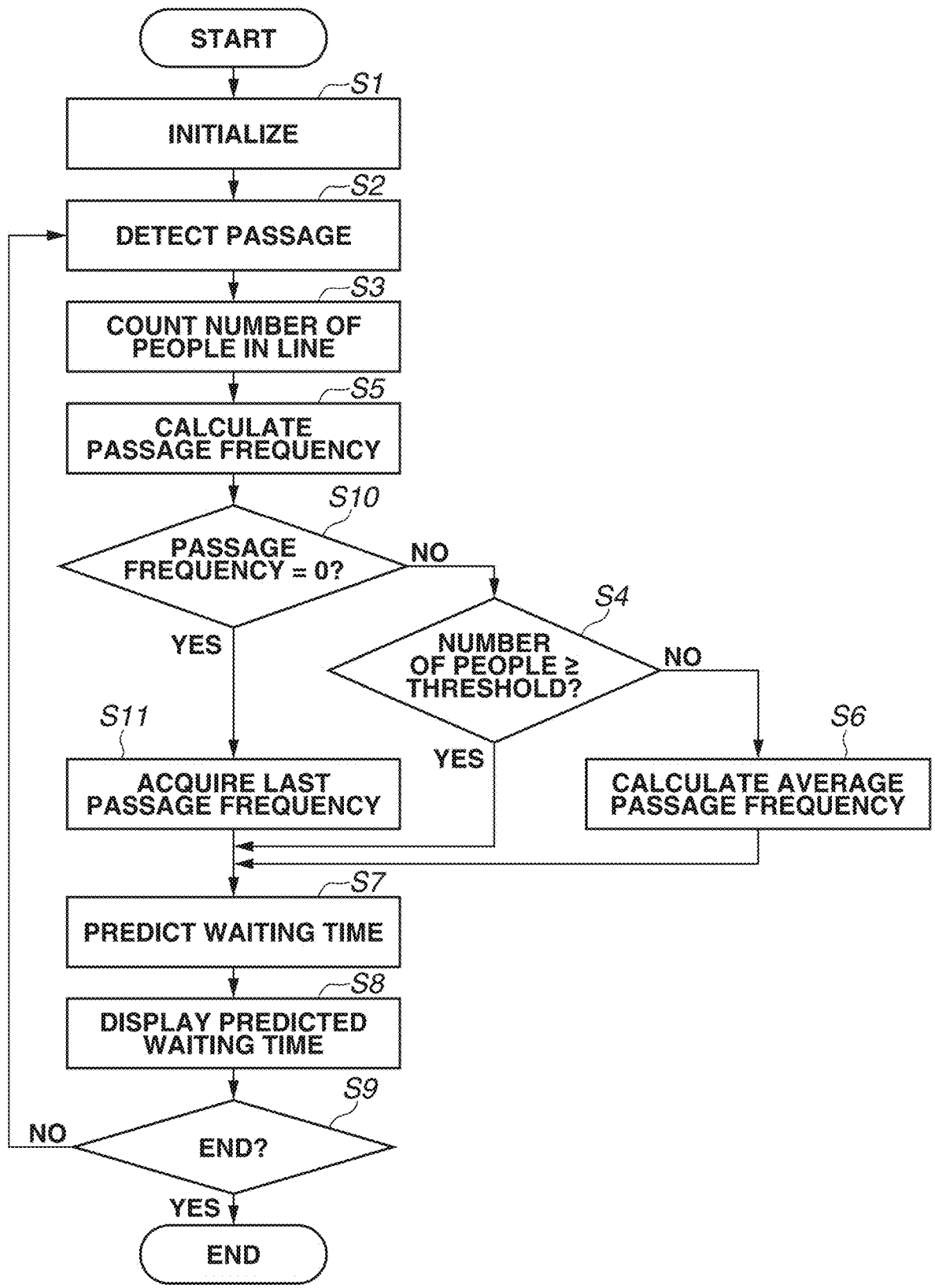
FIG. 7 is a flowchart illustrating an example of a processing procedure of waiting-time prediction processing.

FIG. 7 is a flowchart illustrating an example of waiting-time prediction processing according to the second exemplary embodiment. In FIG. 7, steps identical to the steps in FIG. 5 of the first exemplary embodiment are provided with numerals identical to those in FIG. 5 and will not be described.

In step S5, the passage frequency calculation unit 209 calculates a passage frequency per unit time in a manner similar to step S5 in FIG. 5.

In step S10, the passage frequency calculation unit 209 according to the second exemplary embodiment determines whether the passage frequency calculated in step S5 is 0. If the passage frequency is not 0 (NO in step S10), the passage frequency calculation unit 209 performs processing similar to the processing described with respect to FIG. 5 in the first exemplary embodiment. In other words, in a case where the counted number of waiting people is less than the threshold (NO in step S4), the passage frequency calculation unit 209 calculates an average passage frequency (step S6). The operation then proceeds to step S7. If the passage frequency calculated in step S5 is 0 (YES in step S10), the operation proceeds to step S11.

In step S11, the passage frequency calculation unit 209 according to the second exemplary embodiment acquires the passage frequency used for the last predicted waiting time from the storage unit 203, and outputs the acquired passage frequency to the waiting time calculation unit 210. The passage frequency calculation unit 209 also stores the acquired passage frequency in the storage unit 203 as a passage frequency used for the current calculation of a waiting time. Steps S7 to S9 are similar to those in the first exemplary embodiment and therefore are not described herein.

As described above, according to the present exemplary embodiment, the last-used passage frequency is used in a case where the passage frequency is 0 because new passage is not detected for a while following the time when the passage of a person in the waiting line through the detection line 23 is last detected. A waiting time can be thus be appropriately predicted even if the passage frequency is 0. This effectively prevents a reduction in the prediction accuracy in the prediction of a waiting time of a waiting line.

Modifications

In the exemplary embodiments described above, in a case where the counted number of waiting people is less than the threshold in step S4 in each of FIG. 5 and FIG. 7, the passage frequency calculation unit 209 can output the above-described last passage frequency (TH1) to the waiting time calculation unit 210 instead of calculating the average passage frequency in step S6.

Alternatively, a plurality of thresholds (a threshold 1, a threshold 2, etc.) can be set, and the last passage frequency (TH1) can be used in a case where the threshold calculation unit 208 determines that the number of waiting people is less than a low threshold. For example, the last passage frequency (TH1) can be used in a case where the number of waiting people is 2 or less. The average passage frequency can be used in a case where the number of waiting people is between 3 and 7. The normal passage frequency can be used in a case where the number of waiting people is 8 or more. In this way, the plurality of thresholds of the number of waiting people can be provided, and the threshold calculation unit 208 can be configured to calculate different passage frequencies using the respective thresholds. Assume, for example, that the last passage frequency (TH1) is used, the passage of one or two persons through the detection line 23 is detected in a predetermined time interval thereafter, and then after a while, one or two persons are counted as the number of waiting people. In this case, it is effective to presume that the conditions are the same.

The configuration of functional blocks illustrated in FIG. 1 is an example, and a plurality of functional blocks can form one functional block, or any one of functional blocks can be divided into blocks including a plurality of functioning blocks. At least one or some of the functional blocks illustrated in FIG. 1 can be implemented as hardware. In the implementation by hardware, for example, an exclusive circuit can automatically be generated on a field-programmable gate array (FPGA) from a program for implementing each step by using a predetermined compiler. As with the FPGA, a gate array circuit can be formed and implemented as hardware, or can be implemented by an application specific integrated circuit (ASIC).

In the above-described exemplary embodiments, in step S4 in each of FIG. 5 and FIG. 7, control for changing a calculation algorithm is performed in a case where the counted number of waiting people is less than the threshold. However, the waiting-time calculation processing can be aborted in a case where the counted number of waiting people is less than the threshold. For example, in a system for displaying the calculated number of waiting people on a display apparatus (not illustrated) near the tail end of a line, the CPU 103 performs control not to display a waiting time without performing the waiting-time calculation processing in a case where the number of waiting people is less than the threshold. In such a case, the CPU 103 can display information, such as a message "Please wait for a while!", on the display apparatus instead of displaying a waiting time.

Other Embodiments

Embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While exemplary embodiments have been described, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-107693, filed May 31, 2017, which is hereby incorporated by reference herein in its entirety.

What is claimed is:

1. An information processing apparatus that calculates a waiting time in a queue, the information processing apparatus comprising a computer executing instructions that, when executed by the computer, cause the computer to function as:
    a first acquisition unit configured to acquire a number of objects having passed through a predetermined position, corresponding to an exit from the queue, within a predetermined period; and
    a calculation unit configured to calculate the waiting time in the queue, by using a number of objects waiting in the queue and by using the number of objects acquired by the first acquisition unit,
    wherein, if the number of objects waiting in the queue is less than a predetermined threshold, the calculation unit calculates the waiting time in the queue by using the number of objects acquired by the first acquisition unit in a case where the number of objects waiting in the queue was greater than or equal to the predetermined threshold.

2. The information processing apparatus according to claim 1, wherein the instruction further cause the computer to function as:
    a determination unit configured to determine whether the number of objects waiting in the queue is greater than or equal to the predetermined threshold; and
    wherein the first acquisition unit acquires, as a first passage frequency, the number of objects passing through the predetermined position within the predetermined period,
    wherein, if it is determined by the determination unit that the number of objects waiting in the queue is greater than or equal to the predetermined threshold, the calculation unit calculates the waiting time in the queue, by using the first passage frequency acquired by the first acquisition unit in a case where the number of objects waiting in the queue is greater than or equal to the predetermined threshold,
    wherein, if it is not determined by the determination unit that the number of objects waiting in the queue is greater than or equal to the predetermined threshold, the calculation unit calculates the waiting time in the queue, by using a second passage frequency which is based on the first passage frequency acquired in a case where the number of objects waiting in the queue was greater than or equal to the predetermined threshold.

3. The information processing apparatus according to claim 2, wherein the instructions further cause the computer to function as:
a storage unit configured to store the number of objects waiting in the queue, the first passage frequency acquired by the first acquisition unit, and the waiting time calculated by the calculation unit, in association with each other.

4. The information processing apparatus according to claim 3, wherein the calculation unit calculates the second passage frequency based on the number of objects stored in the storage unit and the waiting time, associated with the number of objects, stored in the storage unit.

5. The information processing apparatus according to claim 3, wherein the storage unit stores a plurality of first passage frequencies acquired by the first acquisition unit in a case where the number of objects waiting in the queue is greater than or equal to the predetermined threshold,
wherein the calculation unit calculates, as the second passage frequency, an average value of the plurality of first passage frequencies stored in the storage unit.

6. The information processing apparatus according to claim 3, wherein the calculation unit calculates, as the second passage frequency, the first passage frequency last stored in the storage unit.

7. The information processing apparatus according to claim 3, wherein the calculation unit calculates the predetermined threshold based on the number of objects waiting in the queue and the waiting time stored in the storage unit.

8. The information processing apparatus according to claim 1, wherein the instructions further cause the computer to function as:
a second acquisition unit that acquires the number of objects waiting in the queue in an image captured by an imaging apparatus.

9. The information processing apparatus according to claim 1, wherein the instructions further cause the computer to function as:
a second acquisition unit configured to acquire the number of objects waiting in the queue,
wherein the calculation unit calculates the waiting time in the queue, by using the number of objects acquired by the second acquisition unit in a case where the number of objects waiting in the queue is less than the predetermined threshold, and by using the number of objects acquired by the first acquisition unit in a case where the number of objects waiting in the queue is greater than or equal to the predetermined threshold.

10. An information processing method that calculates a waiting time in a queue, the information processing method comprising:
acquiring a number of objects having passed through a predetermined position, corresponding to an exit from the queue, within a predetermined period; and
calculating the waiting time in the queue, by using a number of objects waiting in the queue and by using the number of objects acquired in the acquiring;
wherein, if the number of objects waiting in the queue is less than a predetermined threshold, the waiting time in the queue is calculated in the calculating by using the number of objects acquired in the acquiring in a case where the number of objects waiting in the queue was greater than or equal to the predetermined threshold.

11. A non-transitory computer-readable storage medium storing a program for causing a computer to execute a method that calculates a waiting time in a queue, the method comprising:
acquiring a number of objects having passed through a predetermined position, corresponding to an exit from the queue, within a predetermined period; and
calculating the waiting time in the queue, by using a number of objects waiting in the queue and by using the number of objects acquired in the acquiring;
wherein, if the number of objects waiting in the queue is less than a predetermined threshold, the waiting time in the queue is calculated in the calculating by using the number of objects acquired in the acquiring in a case where the number of objects waiting in the queue was greater than or equal to the predetermined threshold.

* * * * *